Figure 4:
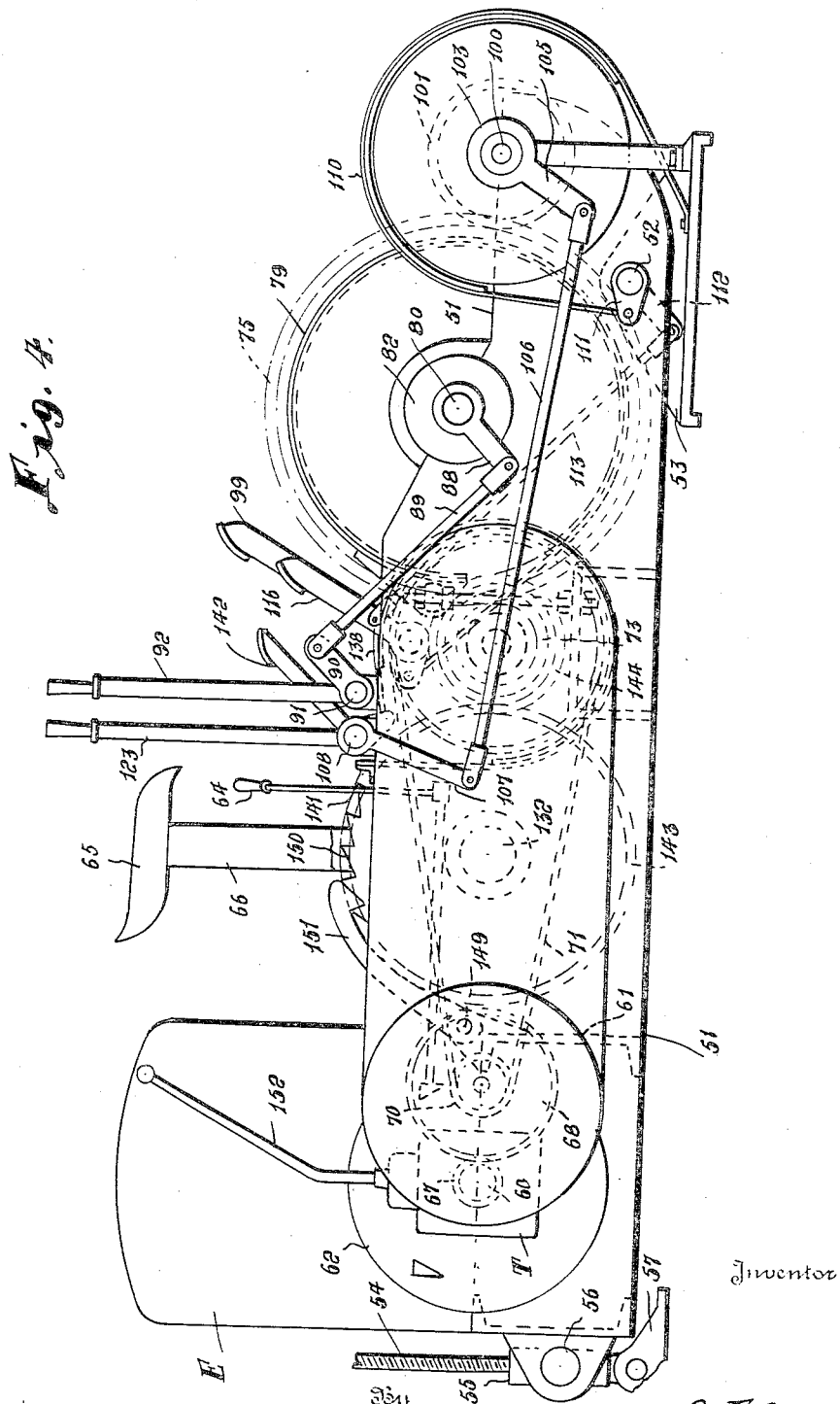

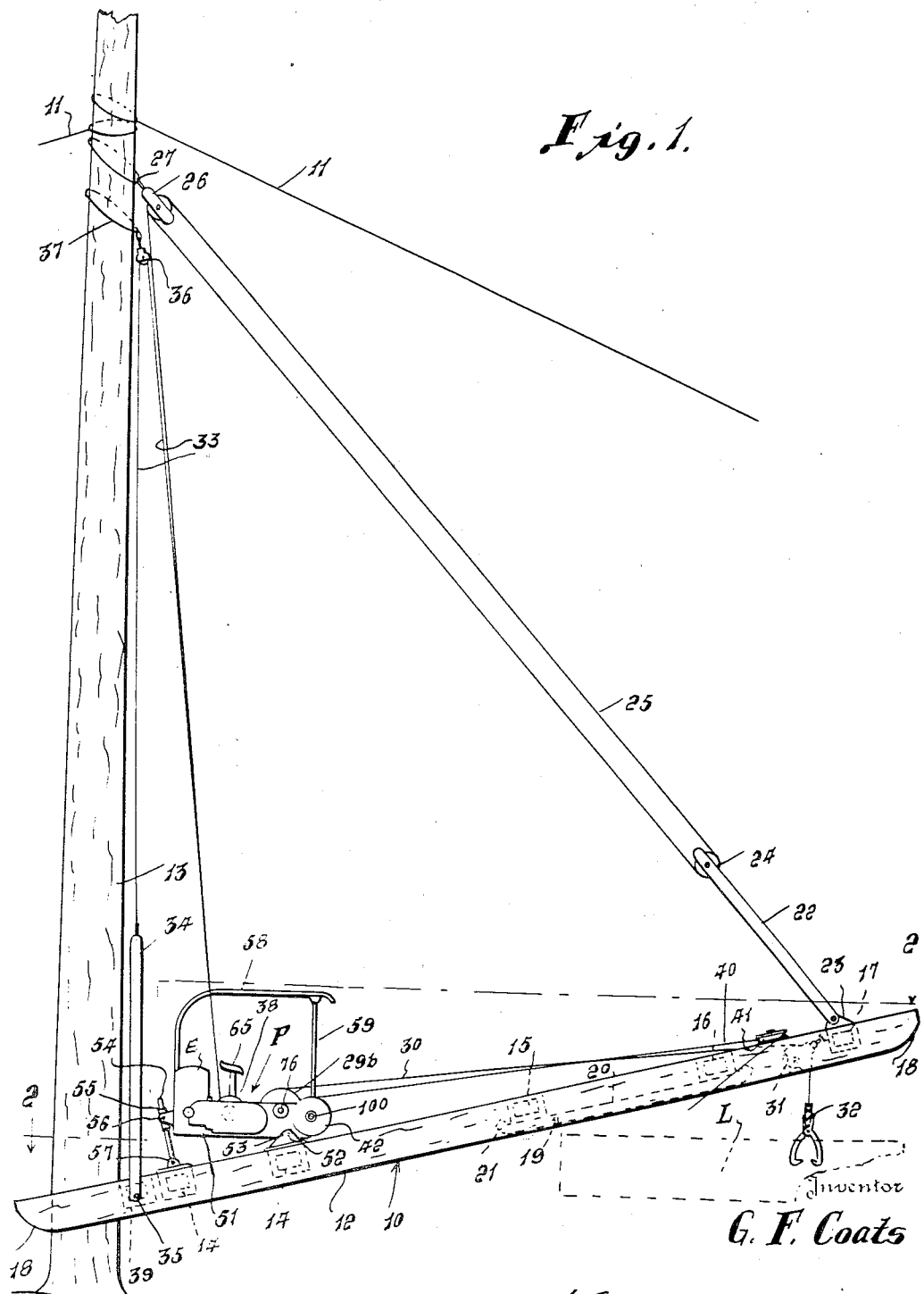

Oct. 31, 1939.　　　　G. F. COATS　　　　2,178,470
LOGGING DEVICE
Filed Dec. 19, 1938　　　　4 Sheets-Sheet 2
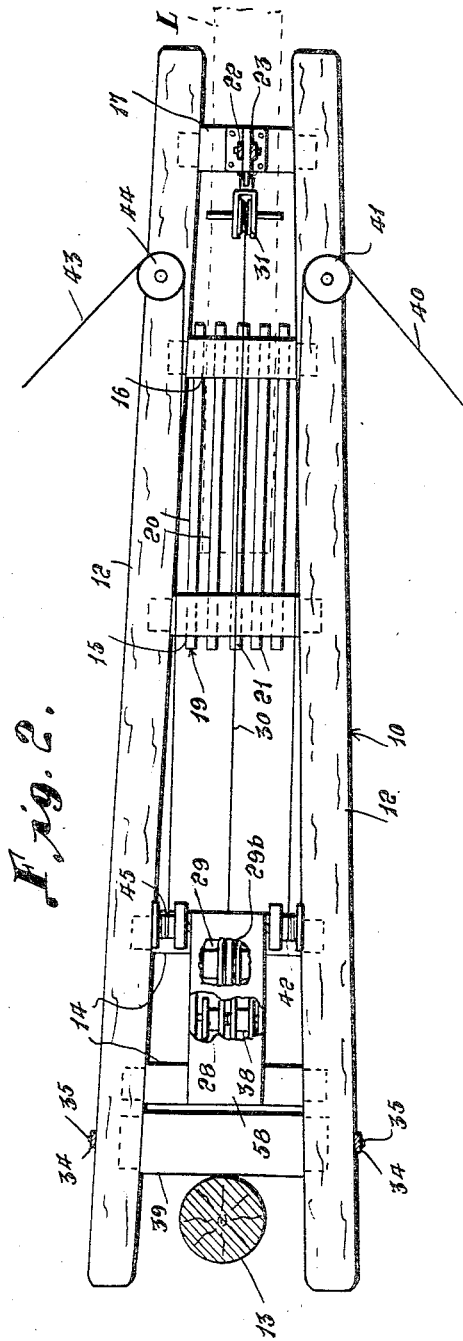
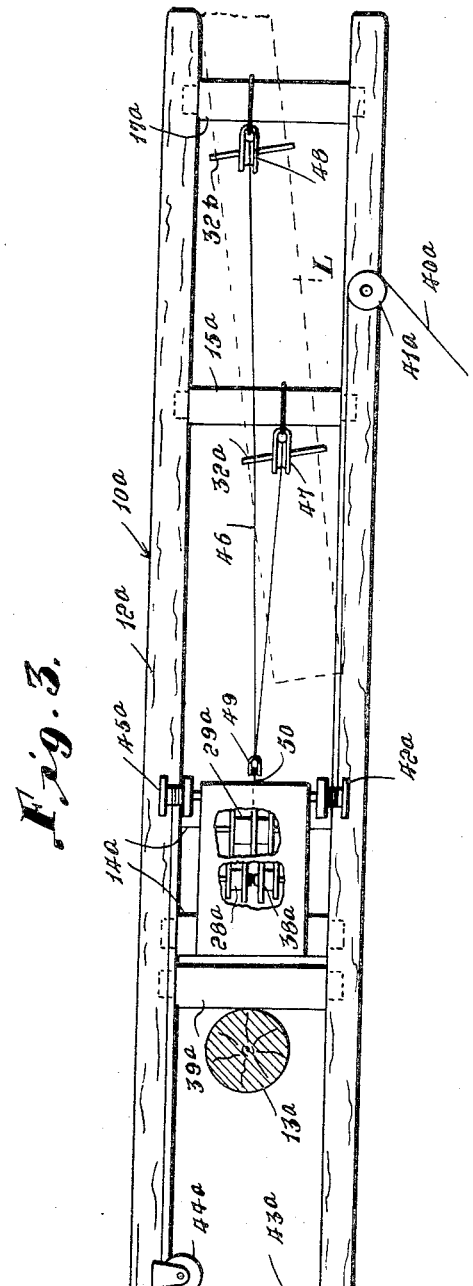
Inventor
G. F. Coats
By Kimmel & Crowell
Attorneys

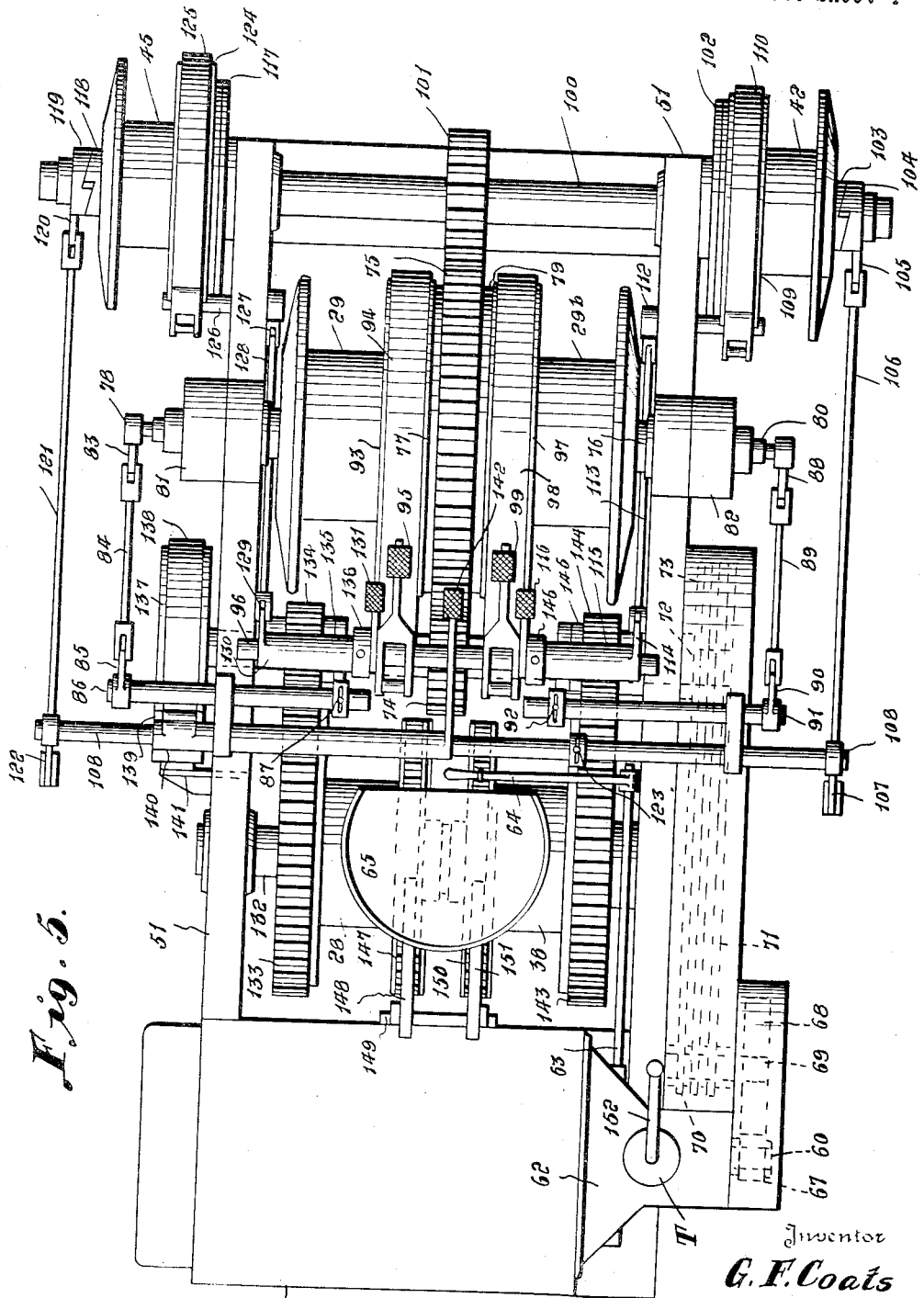

Patented Oct. 31, 1939

2,178,470

UNITED STATES PATENT OFFICE 2,178,470

LOGGING DEVICE

George F. Coats, Tillamook, Oreg.

Application December 19, 1938, Serial No. 246,719

12 Claims. (Cl. 212—64)

This invention relates to a logging device and more particularly to an improved logging boom.

An object of this invention is to provide a logging boom which is so constructed that the boom may be readily and quickly mounted on a spar tree, the boom including means for elevating or lowering the boom relative to the spar tree in addition to elevating logs relative to the boom.

Another object of this invention is to provide an improved boom structure having a power means mounted thereon, the boom being constructed in the form of a skid so that the boom can be readily shifted from one location to another in a much quicker time than is possible where the power means for the boom is separate from the boom.

A further object of this invention is to provide in a boom structure an outer member which is adapted to be mounted adjacent the inner end of the boom and means for adjusting the power device relative to the boom so that the power device may be maintained in a horizontal position with the boom at an inclination to the horizontal.

A further object of this invention is to provide an improved power means for elevating and swinging a boom whereby a single boom may be used in varying locations where booms at present in use cannot be used.

A further object of this invention is to provide a combined boom and power unit which is so constructed that the boom can be readily shifted from one side of the spar tree to the other in a very short space of time irrespective of the configuration of the ground beyond the end of the boom or on the opposite sides of the spar tree.

A further object of this invention is to provide a combined boom and power unit which can be brought up to the spar tree by the truck, trailer or flat car and promptly set up for operation and conversely may be removed from the spar tree by backing the truck, trailer or flat car up to the spar tree for raising or lowering the boom by the self contained power unit and then removing the rigging secured to the spar tree.

A further object of this invention is to provide a combined boom and power unit so that the logging operations may be carried forward regardless of the rough or limited nature of the ground which with the use of a donkey engine requires the location of the engine at a remote point from the actual logging operation.

A still further object of this invention is to provide a combined boom and power means therefor which is so constructed that it can be quickly set up at the desired location and can also be shifted from one location to another in a much quicker time than is possible with present boom structures, the device being capable of mounting on a trailer so that the boom can be quickly shifted, the boom being a complete unit in itself so that when the boom is placed on a location the boom is capable of immediate operation.

To the foregoing objects and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a detail side elevation of a boom constructed according to an embodiment of this invention, Figure 2 is a detail top plan of the boom, Figure 3 is a detail top plan of a modified form of boom structure, Figure 4 is a detail side elevation of the power means associated with the boom, and Figure 5 is a detail top plan of the power device.

Referring to the drawings and first to Figures 1 and 2, the numeral 10 designates generally a boom structure which is movably engaged with a vertically disposed spar tree 13. The spar tree 13 is normally topped and guy members 11 are secured at their upper ends to the spar tree 13 at a point adjacent the upper end thereof and are then anchored at suitable points remote from the spar tree 13 so as to prevent the tilting of the tree 13 during the operation of the boom 10.

The boom 10 comprises a pair of elongated spaced apart log members 12 which are held in spaced apart relation by means of a plurality of transversely disposed connecting members 14, 15, 16 and 17. There are two transverse members 14 which are disposed adjacent one end of a pair of boom members 12 and the transverse member 17 is positioned adjacent the opposite end of the members 12. The two transverse members 15 and 16 are positioned intermediate the end member 17 and the two members 14. Preferably, the two boom members 12 are provided with bevelled or arcuate opposite end portions 18 which facilitate the dragging of the boom structure 10 over the ground.

The boom 10 is provided with a heeling grid generally designated 19 which comprises a plurality of elongated spaced apart parallel bars 20 which are provided with upturned opposite end portions 21. These bars 20 are secured to the under sides of the transverse members 15 and 16 and provide a means whereby the inner or rear end of the log L may contact with the under side of the boom during the raising or lowering operation.

The boom 10 has secured to the forward end thereof a bridle or elongated member 22 which at its lower end is pivotally secured to a strap 23 engaging the transverse connecting member 17 and the upper end of the bridle 22 has a sheave or pulley 24 rotatably carried thereby. A cable or flexible member 25 is trained about the sheave 24 and one end thereof is secured to an upper sheave 26 which is fixed as by a fastening means 27 to the spar tree 13 adjacent the upper end of the spar tree. The flexible elevating member 25 is trained over the sheave 26 and is then wound about a rotatable drum 28. The drum 28 forms part of a power member generally designated as P which is secured as will be hereinafter described to the upper side of the boom 10. Rotation of the drum 28 in one direction will raise the forward end of the boom 10 and rotation in the opposite direction will lower the boom 10. The power member P is provided with a loading drum 29 about which a loading cable 30 is wound. The loading cable 30 engages through a sheave 31 which is swingably secured to the connecting member 17 on the inner side thereof and a grab hook 32 is secured to the outer or free end of the cable 30. Where only one cable is used the grab hook 32 is adapted to engage the log L at a point rearwardly of the longitudinal center thereof so that when the log L is raised the rear end thereof will rise first and engage against the under side of the heeling grid 19. The forward or outer end of the log L may then be raised so as to position the log L at the desired loading angle. In Figures 1, 2 and 3 there is disclosed a power member P having a single loading drum 29 but it will be understood that two loading drums may be used similar to the loading drums shown in Figure 5 to be hereinafter described.

The rear end of the boom 10 is elevated or lowered by means of a cable or flexible member 33 which at one end thereof is secured to a bridle 34 which is rockably secured by pivotal members 35 to the rear end portion of the boom 10 and this cable 33 is trained over a sheave 36 secured as by a fastening means 37 to the upper portion of the spar tree 13. The cable 33 is wound about an elevating drum 38 carried by the power member P so that the rear portion of the boom 10 may be vertically adjusted to any desired height relative to the ground. The boom 10 at the rear portion thereof as shown in Figures 1 and 2 is provided with a transversely disposed heel member 39 which is secured between the two side members 12 rearwardly of the rearmost member 14 and this heel member is adapted to contact with the exterior of the spar tree and provides a fulcrum for rocking the outer end of the boom 10 in addition to swinging the boom 10 horizontally.

The bridle 34 may be constructed of a single U-shaped member which engages on opposite sides of the two side members 12 of the boom and the free end of the cable 33 is adapted to be connected to the bight of the U-member 34. In order to provide a means whereby the boom 10 may be swung in a horizontal plane in one direction, I have provided a boom swing or slew line or cable 40 which at one end is adapted to be anchored to a stationary member in the form of a stump or tree remote from the spar tree 13. The cable 40 is trained about a sheave 41 rotatably carried by the boom 10 on one side thereof adjacent the forward end of the boom and the cable 40 is wound about a swing or slew drum 42 which forms part of the power member P. Winding of the cable 40 about the drum 42 will swing the boom 10 in one direction.

The boom 10 may be swung in the opposite direction by means of a second swing or slew cable 43 which is trained about a sheave or pulley 44 carried by the opposite side of the boom 10. The cable 43 is wound about a second swing or slew drum 45 carried by the power member P and winding of the cable 43 about the drum 45 will swing the boom horizontally in a direction opposite from the swinging thereof effected by the cable 40.

In Figure 3 there is disclosed a slightly modified form of boom structure 10ª which comprises substantially parallel or spaced apart side members 12ª which are held in spaced apart relation by means of transverse members 14ª, 15ª and 17ª. The boom 10ª is provided with a heel member 39ª similar to the heel member 39, but the heel 39ª is positioned at a point forwardly of the heel member 39 so that a considerable portion of each side member 12ª will project rearwardly beyond the spar tree 13ª. The boom 10ª is adapted to have associated therewith the elevating members similar to those disclosed in Figures 1 and 2 which are operated by elevating drums 28ª and 38ª. The log L which is raised by the boom 10ª is raised by means of a pair of grab hooks 32ª and 32ᵇ. These grab hooks are secured to a single cable 46 which is trained through sheaves 47 and 48 and is secured to a clevis 49. The clevis 49 is secured to a log raising cable 50 which is wound about a loading drum 29ª and with the use of the two grab hooks 32ª and 32ᵇ the log L is adapted to be raised in a horizontal position. The boom 10ª has mounted on one side member 12ª thereof a sheave 41ª about which a slew or swing cable 40ª is trained which is wound about a slew or swing drum 42ª. This cable 40ª is adapted to be anchored at its free end to a stationary member such as a stake, small tree or the like so that winding of the drum 42ª will swing the boom 10ª horizontally in one direction.

Where the boom 10ª is mounted in the position where the second slew or swing cable 43ª cannot be anchored laterally of the spar tree 13ª opposite from the point where the cable 40ª is anchored the cable 43ª is adapted to be anchored on the same side or even to the same point as the cable 40ª. Swinging of the boom 10ª in a direction opposite from the swinging thereof by means of the cable 40ª is accomplished by mounting a sheave 44ª to the rear end of the boom 10ª on a side thereof opposite from the sheave 41ª. The cable 43ª is wound about a drum 45ª so that winding of the cable 43ª on the drum 45ª will swing the boom 10ª in a horizontal direction opposite from the swinging thereof under the winding of the cable 40ª. It will also be understood that if desired the cable 40ª may have the sheave 41ª thereof positioned to the rear of the boom 10ª and this cable then anchored to a stationary anchor on the side of the spar tree 13ª from the anchoring member for the cable 43ª.

The power member P is mounted on a platform or frame structure 51 and at its forward end is rockably mounted on a shaft 52 carried by a pair of upstanding lugs or plates 53 which are fixedly secured to the forward transverse member 14. The platform or frame 51 is maintained in a horizontal position by means of a frame adjusting screw 54 which is threaded through a nut 55 carried by supporting members 56 secured to the rear of the frame 51. The lower end of the adjusting screw 54 is rockably and swivelly carried by supporting means 57 secured to the rearmost transverse member 14. The frame 51 has a substantially L-shaped housing member 58 secured thereto, one portion of the housing member 58 being disposed in a substantially vertical position and secured to the frame 51 and the other portion of the housing member 58 being a roof or top and positioned above the frame 51. Posts 59 are secured at the forward portion of the frame 51 and at the forward end of the housing member 58.

One form of power means for the boom 10 is shown in Figures 4 and 5 and comprises an engine E having a transmission T of conventional construction and a drive shaft 60. The engine E is mounted on supporting members 61 which are secured to the frame 51 and the engine E is also provided with a clutch 62 between the engine E and the transmission T which clutch may be of any suitable construction. A clutch operating shaft 63 is operatively connected to the clutch 62 and an operating handle 64 is secured to the shaft 63 and is positioned closely adjacent a seat 65 mounted on a seat supporting member 66 which is positioned substantially in the transverse center of the frame 51.

A driving pinion or gear 67 is secured to the drive shaft 60 and meshes with a driven gear 68 mounted on a drive shaft 69 rotatably carried by the frame 51. The shaft 68 also has a grooved pulley or driving member 70 secured thereto about which flexible means 71 in the form of a belt, chain or other driving means is trained. A main drum driving shaft 72 is rotatably carried by the frame 51 and is provided with a pulley 73 about which the flexible member 71 is trained. The shaft 72 is provided at a point intermediate the ends thereof with a drum driving pinion or gear 74 which meshes with a relatively large gear 75 carried by a shaft 76. The shaft 76 has a pair of loading drums 29 and 29b loosely mounted thereon and the drum 29 has a clutch mechanism 77 associated therewith and actuated by means of a clutch operator 78. The drum 29b has a clutch 79 associated therewith and actuated by means of a clutch operator 80. The shaft 76 is rotatably carried by bearings 81 and 82 which are fixed to the frame 51. Clutch operator 78 includes a lever 83 which has connected thereto a link 84. The link 84 is connected to a rock lever 85 secured to a shaft 86 rockably carried by the frame 51 and an operating lever 87 is fixed to the shaft 86.

In the present instance, the clutch 77 is of the type which is normally spring pressed to an unclutching position and the clutch is moved to a clutching position by rotation of the lever 83. The clutch operating shaft or member 80 has a lever 88 fixed thereto which has one end of a link 89 connected therewith and the other end of the link 89 is connected to a lever or arm 90 fixed to a shaft 91. The shaft 91 is rockably carried by the frame 51 and has an operating lever 92 secured thereto so that rocking of the lever 92 will effect operation of the clutch 79 which is normally spring pressed to a declutching position. The loading drum 29 has secured thereto a brake drum 93 about which a brake band 94 engages and this brake band 94 is operatively connected to a pedal or rock lever 95 rockably carried by a shaft 96. The loading drum 29b has a brake drum 97 secured thereto and a brake band 98 engages about the drum 97 and is operatively connected to a pedal or rock lever 99.

The slew or swing drum 42 is rotatably mounted on a transversely disposed shaft 100 having a gear 101 fixed thereto which meshes with the gear 75. The drum 42 has a clutch 102 associated therewith which is actuated by means of non-rotatable cam member 103 and a rotatable cam member 104. The cam member 104 is rocked by rocking of a lever 105 which is fixed thereto and is connected to one end of a link or tie rod 106. The link or tie rod 106 is connected at the opposite end to a lever or arm 107 which is fixedly mounted on a rock shaft 108 extending transversely of the frame 51 and projects beyond the opposite sides thereof. A brake drum 109 is carried by the winding drum 42 and a brake band 110 is disposed thereabout and is connected to a brake operating lever or arm 111. The arm 111 is rocked by means of a rock lever 112 which is connected to one end of a link 113. The link 113 is connected to a lever 114 carried by a sleeve 115 rotatably mounted on the shaft 96. An operating lever or pedal 116 is fixed to the sleeve 115 so that rocking of the pedal 116 will effect contraction of the brake band 110.

The second swing or slew drum 45 is rotatably mounted on the opposite end of the shaft 100 and has associated therewith a clutch means 117 which is actuated by horizontal sliding movement of a non-rotatable operating member 118. A rotatable clutch operating member 119 is adapted to engage the slidable operating member 118 which is constructed in the form of a cam and a lever 120 is fixed to the operating member 119. A link 121 is connected at one end to the lever 120 and at the opposite end to a rock lever 122 carried by the end of the shaft 108 opposite from the lever 107. The cam members 118 and 119 are pitched oppositely from the cam members 103 and 104 so that rocking of the shaft 108 in one direction will effect clutching of the clutching member 102 and rocking of the shaft 108 by the operating member 123 will effect clutching of the clutch 117 and a declutching of the clutch 102. The drum 45 has a brake drum 124 fixed thereto about which a brake band 125 engages and this band is contacted by rocking of a shaft 126 having an operating lever 127 fixed thereto. The lever 127 is connected to one end of a link 128 and the opposite end of the link 128 is connected to a lever or arm 129 secured to a sleeve 130. The sleeve 130 has a pedal 131 fixed thereto so that rocking of the pedal 131 in one direction will contract the band 125 and hold the drum 45 against rotation.

The heel drum or elevated member 23 is rotatably mounted on a shaft 132 and this shaft 132 has a relatively large gear 133 loose thereon which is fixed relative to the drum 23 and meshes with a driving pinion 134 which is loose on the shaft 72. The pinion 134 has associated therewith a clutch device 135 actuated by means of a clutch operating member 136 so that clutching of the clutch device 135 will operatively connect the shaft 132 with the shaft 72. The shaft 72 has a brake drum 137 fixed to one end thereof about which a brake band 138 engages and which is operatively connected to a rock lever 139 carried by a sleeve 140 which is mounted on the shaft 108. One end of the brake band 138 is held stationary by means of an outstanding bracket 141 which is fixed to one side of the frame 51. The sleeve 140 is rocked by means of a pedal 142 which is positioned between the two pedals 95 and 99.

The heel or elevating drum 38 has a gear 143 fixed thereto and the drum 38 is loose on the shaft 132. A driving pinion 144 is loose on the shaft 72 and has associated therewith a clutch device 145 which is operated by means of an operating member 146.

The drum 28 has secured to one side thereof a toothed ratchet member 147 and a rockable pawl 148 carried by shaft 149 is adapted to gravitatingly engage the ratchet 147 so as to hold the drum 28 against rotation in one direction. Preferably the pawl 148 holds the drum 28 against unwinding so that when the correct elevation of the boom 10 has been determined, the pawl 148 may be swung to a locked position and thus hold the rear end of the boom 10 in the selected elevated position.

The drum 38 has a ratchet 150 secured thereto and a pawl 151 is rockably mounted on the shaft 149 and is adapted to hold the drum against rotation in one direction, preferably the unwinding of the drum 38.

In the use and operation of this device, the spar tree is initially topped in the usual manner and all of the branches cut off whereupon the boom member 10 has the rear or heel member 39 placed in contacting relation with the spar tree with the tree 13 between the two side members 12. As the heel member 39 is positioned forwardly of the rear ends of the side members 12, the side members 12 will be held against lateral movement when the tree 13 is engaged with the heel member 39. The elevator drums 28 and 38 are initially operated to position the boom 10 in the desired position with the boom either in a horizontal position or in a position inclined to the horizontal as shown in Figure 1. When this position has been determined, the drums 28 and 38 are locked against unwinding by the pawl member 148 and 151. The drums 28 and 38 may be rotated together by clutching of the clutch devices 135 and 145 and the rotation of the drums 28 and 38 may be retarded by contracting of the brake band 138 at which time the clutch 62 is de-clutched by means of the clutch operating lever 64. The transmission T is controlled by a shifting lever 152 so as to rotate the driving shaft 60 and the remaining shafts operatively connected therewith at the desired speed.

The hook 32 is engaged with the log L adjacent one end thereof or at a point at one side of the longitudinal center so that when the winding drum 29 is rotated to wind the cable thereon, the log L will have its lower end lifted initially and this rear end will abut against the heel grid 29. When the log 11 engages the grid 29 additional raising of the hook 32 will lift the forward end of the log which may be held in either a horizontal position or any other desired position. After the log L has been raised, the boom 10 may be swung horizontally by rotation of a selected swing or slew drum 42 or 45. Assuming that the boom is to be swung to the right as viewed in Figures 2 and 3, the clutch operating members 103 and 104 are moved to a clutching position by rocking of the shaft 108 by means of the lever 123 in a clockwise direction.

At this time the clutch members 118 and 119 will be maintained in a de-clutching position so that the drum 145 may rotate to unwind the swing cable 43 as the cable 40 is being wound upon the drum 42. Operation of the pedal 116 will effect contraction of the brake band 110 so as to hold the drum 42 against rotation.

The rotation of the loading drum 29 is effected by rocking of the lever 87 which will move clutch operating member 78 to a clutching position so as to clutch the drum 29 through the gear 75. The gear 75 is rotated at all times by the rotation of the gear 74 which is fixed to a shaft 72, the rotation of which is controlled by the main driving clutch and the transmission T.

Where a boom similar to that disclosed by Figure 3 is used, the swinging of the boom 10a in one direction is effected by the winding of the cable 40a on the drum 42a and at this time the drum 45a is loose on the shaft similar to the shaft 108. Swinging of the boom 10a in the opposite direction is effected by winding of the cable 43a on the drum 45a at which time the drum 42a is rotated to unwind the cable 40a.

A boom constructed according to this invention when placed in actual operation has been found to greatly facilitate logging operations where the logging operations are performed either in conjunction with railroads or remote therefrom where the operations are carried on under conditions where only trucks and trailers are used to move the logs. With a boom constructed according to this invention it is possible to use internal combustion engines as a power means and to mount the engine or power device directly on the boom thereby providing an exceedingly compact logging device which can be loaded for moving on a truck and trailer, railroad car or may be even dragged along the ground for at least short distances.

The boom hereinbefore described can be placed in actual operation much quicker than a boom which is operated by a separate power device and can be used in hilly locations where it is difficult to mount a power device.

What I claim is:

1. In combination, a boom member comprising spaced apart elongated members, transverse connecting members between said elongated members and positioned inwardly of the ends of said elongated members, a heel member inwardly of one end of said elongated members, a power element supporting frame arranged over and disposed between the transverse median and rear end of the boom, means for pivotally connecting the forward end of said frame to one of said transverse connecting members, an interiorly threaded tubular member supported from the rear end of said frame, means rockably and swivelly connected to another of said transverse connecting members and threadedly engaging with said threaded member for adjusting the angular relation of the frame relative to the boom.

2. In combination, a boom member comprising a pair of elongated spaced apart members, transverse connecting members between said elongated members and positioned inwardly of the ends of said elongated members, a heel member inwardly of one end of said elongated members, a frame disposed above said elongated members, means pivotally securing one end of said frame on said boom member, threaded adjusting means engaging said boom member and said frame to adjust the angular relation of said frame relative to said boom member, and power means carried by said frame.

3. In combination, a boom member comprising a pair of spaced apart elongated members, a plurality of spaced apart connecting members extending transversely between said elongated members, a plurality of parallel bars secured to certain of said transverse members between the ends of said elongated members, a frame member disposed above said boom member, means pivotally securing the forward end of said frame member to said boom member, and means connected to said frame and said boom member for vertically adjusting the opposite end of said frame relative to the boom member.

4. A boom comprising a pair of spaced apart elongated members, a plurality of transversely disposed connecting members connecting said elongated members together in spaced apart relation, a frame member disposed above said elongated members, means pivotally securing the forward end of said frame member to said elongated members, a substantially vertically disposed threaded member swivelly carried by one of said connecting members, a nut fixed to said frame threadably engaging said threaded member, and means carried by said frame for elevating said elongated members.

5. A boom comprising in combination an elongated boom member, a frame disposed above said boom member, means pivotally securing one end of said frame to said boom member, means engaging said boom and said frame for adjusting the angular relation of said frame relative to said boom member, a power member carried by said frame including means for raising the forward end of said boom, means for raising the rear end of said boom, and means for horizontally swinging said boom.

6. A boom comprising in combination a boom member including a pair of spaced apart elongated members, means securing said members together in spaced apart relation, said means being disposed inwardly of the opposite ends of said elongated members, a heel member extending transversely between said elongated members inwardly of one end thereof, a frame member above said boom member, means pivotally securing the forward end of said frame member to said boom member, means engaging said frame member and said boom member for adjusting the angular relation of said frame member relative to said boom member, a plurality of winding drums carried by said frame, means engaging certain of said drums and said boom for elevating said boom, and means engaging certain others of said drums for horizontally swinging said boom.

7. A boom comprising in combination a boom member, a frame, means pivotally securing the forward end of said frame to said boom member, means engaging the rear end of said frame to adjust the angular relation of said frame to said boom member, an elevating drum rotatably carried by said frame, an elevating flexible member trained about said elevating drum and connected to the forward end of said boom, a second elevating drum journalled in said frame, a flexible elevating member wound about said second elevating drum and adapted to elevate the rear end of said boom member, a boom swinging drum rotatably carried by said frame, a boom swinging cable wound about said swinging drum, a sheave rotatably carried by said boom member adjacent the forward end thereof, said swing cable being trained through said sheave, a second swing drum rotatably carried by said frame, a second swing cable wound about said second swing drum, a second sheave rotatably carried by said boom member adjacent the forward end thereof, said second swing cable being trained through said second sheave, and means for rotating said drums.

8. A boom comprising in combination a boom member, a frame, means pivotally securing the forward end of said frame to said boom member, means engaging the rear end of said frame to adjust the angular relation of said frame to said boom member, an elevating drum rotatably carried by said frame, an elevating flexible member trained about said elevating drum and connected to the forward end of said boom, a second elevating drum journalled in said frame, a flexible elevating member wound about said second elevating drum and adapted to elevate the rear end of said boom member, a boom swinging drum rotatably carried by said frame, a boom swinging cable wound about said swinging drum, a sheave rotatably carried by said boom member adjacent the forward end thereof, said swing cable being trained through said sheave, a second swing drum rotatably carried by said frame, a second sheave rotatably carried by said boom member adjacent the rear end thereof, said second swing cable being trained through said second sheave and operable to swing said boom in a direction opposite from said first swing cable.

9. In combination, a boom member comprising a pair of spaced apart elongated members, a plurality of spaced apart connecting members extending transversely between said elongated members, a plurality of bars arranged between and disposed parallel to said elongated members, said bars having their end terminal portions secured to certain of said transverse members located between the ends of said elongated members, a frame member disposed above said boom member, means for pivotally securing the forward end of said frame member to another one of said connecting members rearwardly of the said certain connecting members, and frame adjusting means engaging the opposite end of said frame member and being rockably and swivelly connected to another one of said connecting members whereby to angularly adjust said frame member relative to said elongated members.

10. In a logging device, an angularly adjustable boom, a power element supporting frame mounted over the boom, means for pivotally connecting the forward end of said frame to the boom, supporting members connected to and extending rearwardly from said frame, an upstanding interiorly threaded tubular member suspended from said supporting members, and upstanding means rockably and swivelly connected to the boom and coacting with said threaded member for adjusting the angular relation of the frame with respect to the boom.

11. In a logging device, a suspended angularly adjustable boom, a horizontally disposed power element supporting frame mounted over the boom, means for pivotally supporting the forward end of the frame from the boom, supporting members connected to and extending rearwardly from the frame, an upstanding interiorly threaded tubular member suspended from said supporting members, an upstanding rotatable means pivoted intermediate its ends and swivelly mounted at its lower end coacting with said tubular member for adjusting the angular relation of the frame with respect to the boom, said rotatable means being supported from the boom, and said tubular member and rotatable means constituting a support for the rear end of the frame.

12. In a logging device, a suspended angularly adjustable boom, a horizontally disposed power element supporting frame mounted over the boom, means for supporting the outer end of the frame and for pivotally connecting such end to the boom, and a combined supporting and adjusting structure for the rear end of said frame, said structure being connected to the boom and to the rear end of the frame and including coacting parts acting on the rear end of the frame for adjusting the angular relation of the latter with respect to the boom.

GEORGE F. COATS.